United States Patent
Huelke et al.

(10) Patent No.: US 10,946,828 B2
(45) Date of Patent: Mar. 16, 2021

(54) MULTI-LAYERED TETHER

(71) Applicant: Ford Global Technologies, LLC, Dearborn, MI (US)

(72) Inventors: David R. Huelke, Milan, MI (US); Eric Axel Smitterberg, Berkley, MI (US); Adrienne Huelke, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 89 days.

(21) Appl. No.: 16/240,227

(22) Filed: Jan. 4, 2019

(65) Prior Publication Data

US 2020/0216010 A1 Jul. 9, 2020

(51) Int. Cl.
| | |
|---|---|
| *B60R 21/2338* | (2011.01) |
| *B60R 21/235* | (2006.01) |
| *B60R 21/237* | (2006.01) |
| *B60R 21/264* | (2006.01) |

(52) U.S. Cl.
CPC ........ *B60R 21/2338* (2013.01); *B60R 21/235* (2013.01); *B60R 21/237* (2013.01); *B60R 21/264* (2013.01); *B60R 2021/23382* (2013.01); *B60R 2021/23509* (2013.01); *B60R 2021/23519* (2013.01)

(58) Field of Classification Search
CPC . B60R 21/2338; B60R 21/235; B60R 21/264; B60R 2021/23382; B60R 2021/23519
See application file for complete search history.

(56) References Cited

U.S. PATENT DOCUMENTS

| | | | | |
|---|---|---|---|---|
| 5,489,119 A | * | 2/1996 | Prescaro | B60R 21/233 |
| | | | | 280/743.2 |
| 5,765,867 A | * | 6/1998 | French | B60R 21/16 |
| | | | | 280/743.1 |
| 6,361,072 B1 | * | 3/2002 | Barnes | B60R 21/233 |
| | | | | 280/728.1 |
| 7,226,079 B2 | | 6/2007 | Hier et al. | |
| 7,980,593 B2 | | 7/2011 | Kim | |
| 8,408,585 B2 | * | 4/2013 | Paxton | B60R 21/2338 |
| | | | | 280/728.2 |
| 8,899,618 B2 | * | 12/2014 | Eckert | B60R 21/231 |
| | | | | 280/731 |
| 2017/0305381 A1 | * | 10/2017 | Kwon | B60R 21/239 |

FOREIGN PATENT DOCUMENTS

| | | |
|---|---|---|
| JP | 5992701 B2 | 9/2016 |
| KR | 1020180000401 A | 1/2018 |

* cited by examiner

*Primary Examiner* — Faye M Fleming
(74) *Attorney, Agent, or Firm* — Frank A. MacKenzie; Bejin Bieneman PLC

(57) ABSTRACT

An airbag assembly includes a base and an airbag extendable from the base to a flat position prior to inflation. A tether is elongated along an axis from a first end of the tether attached to the base to another end of the tether attached to the airbag in the flat position. A reinforcement is elongated along the axis in the flat position state and attached to the tether. The reinforcement has a greater torsional rigidity about the axis than the tether.

16 Claims, 4 Drawing Sheets

MULTI-LAYERED TETHER

BACKGROUND

An airbag assembly may include a base, an airbag, and one or more tethers extending from the base to the airbag through an inflation chamber of the airbag. The tethers assist in control of the shape and size of the airbag and/or the pressure of the airbag. For example, the tether may extend from the base to a panel of the airbag and may be stitched to the panel of the airbag to control the shape and size of the airbag when inflated. The length of the tether, at least in part, controls the shape and size of the airbag. As another example, the tether may extend to a vent of the airbag to control opening of the vent. For example, the tether may be selectively released from the base, e.g., with a pyrotechnically-operated release, to open the vent. In such an example, the length of the tether will affect the operation of the vent.

DETAILED DESCRIPTION

Figure 1:
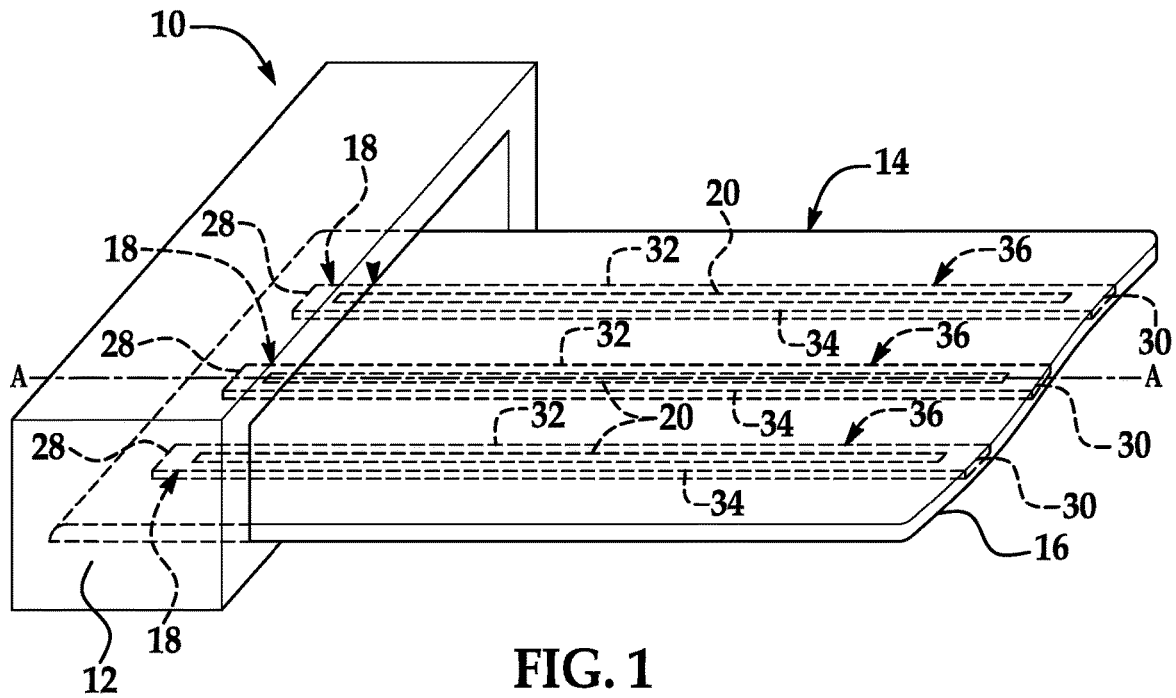
FIG. 1 is a perspective view of an airbag in a flat position during assembly including a multi-layered tether attached to an impact panel.

An airbag assembly includes a base, an airbag extendable from the base to a flat position prior to inflation, a tether elongated along an axis from a first end of the tether attached to the base to a second end of the tether attached to the airbag in the flat position, and a reinforcement elongated along the axis in the flat position and attached to the tether. The reinforcement has a greater torsional rigidity about the axis than the tether.

The reinforcement may extend from the first end to the second end of the tether.

The airbag may be furled in the base in an assembled position. The tether and the reinforcement may be furled from the second end towards the first end in the assembled position.

The tether may include a first surface and a second surface each extending from the first end to the second end and facing in opposite directions. The reinforcement may be disposed on one of the first surface and the second surface.

The tether may define a cavity extending along the axis in the flat position, and the reinforcement may be disposed in the cavity.

The airbag may be furled in an assembled position. The tether and the reinforcement may be furled along the axis in the assembled position.

The reinforcement may have a thickness extending transverse to the axis. The thickness may be less than or equal to approximately 0.5 mm.

The reinforcement may be stitched to the tether.

The airbag may define an inflation chamber. The tether and the reinforcement may be disposed in the inflation chamber.

The reinforcement may be biaxially-oriented polyethylene terephthalate.

The tether may be fabric.

The reinforcement may have a rectangular prism shape.

The airbag may include an impact panel, and the tether may be attached to the impact panel.

The airbag may include a vent, and the tether may extend to the vent.

The airbag assembly may include a release releasably connecting the tether to the base.

The release may be pyrotechnic.

With reference to the Figures, wherein like numerals indicate like parts throughout the several views, an airbag assembly 10 is generally shown. The airbag assembly 10 includes a base 12, an airbag 14 extendable from the base to a flat position prior to inflation, and a tether 18 extending along an axis A from a first end 28 of the tether 18 attached to the base 12 to a second end 30 of the tether 18 attached to the airbags 14 in the flat position. A reinforcement 20 is elongated along the axis A in the flat position and attached to the tether 18. The reinforcement 20 has a greater torsional rigidity about the axis A than the tether 18.

Since the reinforcement 20 has a greater torsional rigidity about the axis A than the tether 18, the reinforcement 20 resists rotation, i.e., twisting, about the axis A more than the tether 18. During assembly of the airbag assembly 10, the reinforcement 20 resists twisting of the tether 18 axis A to reduce the likelihood that an assembly worker will accidentally twist the tether 18 before attachment of the tether 18 to the base 12 and the airbag 14. In other words, the reinforcement 20 acts as an assembly aid to reduce the likelihood that the tether 18 is unintentionally twisted during assembly of the airbag assembly 10. For example, after the tether 18 is attached to one of the base 12 and the airbag 14, the reinforcement 20 resists twisting of the tether 18 about the axis A, e.g., relative to the other of the base 12 and the airbag 14, during attachment of the tether 18 to the other of the base 12 and the airbag 14. In other words, the reinforcement 20 maintains a desired orientation of the tether 18 during attachment of the tether 18 to the base 12 and the airbag 14, i.e., during assembly of the airbag assembly 10.

The airbag assembly 10 may be supported by any suitable vehicle component, e.g., an instrument panel, a steering wheel, a seatback, etc. The airbag assembly 10 includes the airbag 14, as set forth above. The airbag 14 is inflatable from an uninflated state, as shown in FIGS. 1-2C and 5A, to the inflated state, as shown in FIGS. 3 and 5B. The vehicle component may support the airbag assembly 10, and specifically, may support the airbag 14 when the airbag 14 is in the inflated state. The airbag assembly 10 may be mounted to the vehicle component, as set forth below.

The base 12, i.e., a housing, may support the airbag 14, as shown in FIGS. 1-3, 5A, and 5B. The base 12 may be mounted to the vehicle component, e.g., an instrument panel, a steering wheel, etc. The base 12 may be flat. As another example, the base 12 may include a cavity (not numbered) that may house the airbag 14 in the uninflated state and may support the airbag 14 in the inflated state. The base 12 may, for example, include clips, panels, etc. for attaching the airbag 14 and for attaching the base 12 to the vehicle component.

The airbag 14 may be monolithic, e.g., a single piece of fabric. As another example, the airbag 14 may include a plurality of segments, i.e., two or more, that are separately formed and subsequently attached together. The segments may be attached to each other in any suitable fashion, e.g., stitching, ultrasonic welding, etc. The airbag 14 may be any suitable type of airbag 14, e.g., a front seat passenger airbag, a driver airbag, a curtain airbag, a side airbag, a knee airbag, or any other suitable type of airbag 14.

The airbag 14 may be formed of any suitable type of material or materials. The airbag 14 may be formed of any suitable airbag material, for example, a woven polymer. For example, the airbag 14 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Figure 2A:
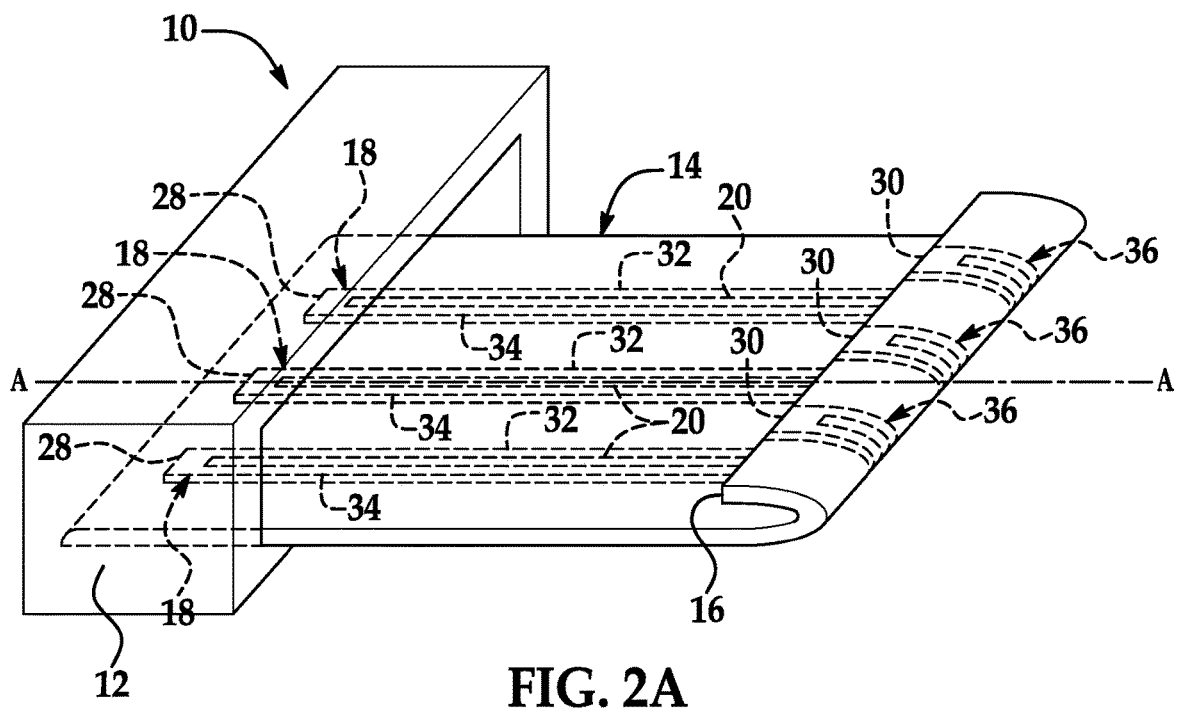
FIG. 2A is a perspective view of the airbag being folded in an uninflated state during assembly
Figure 2B:
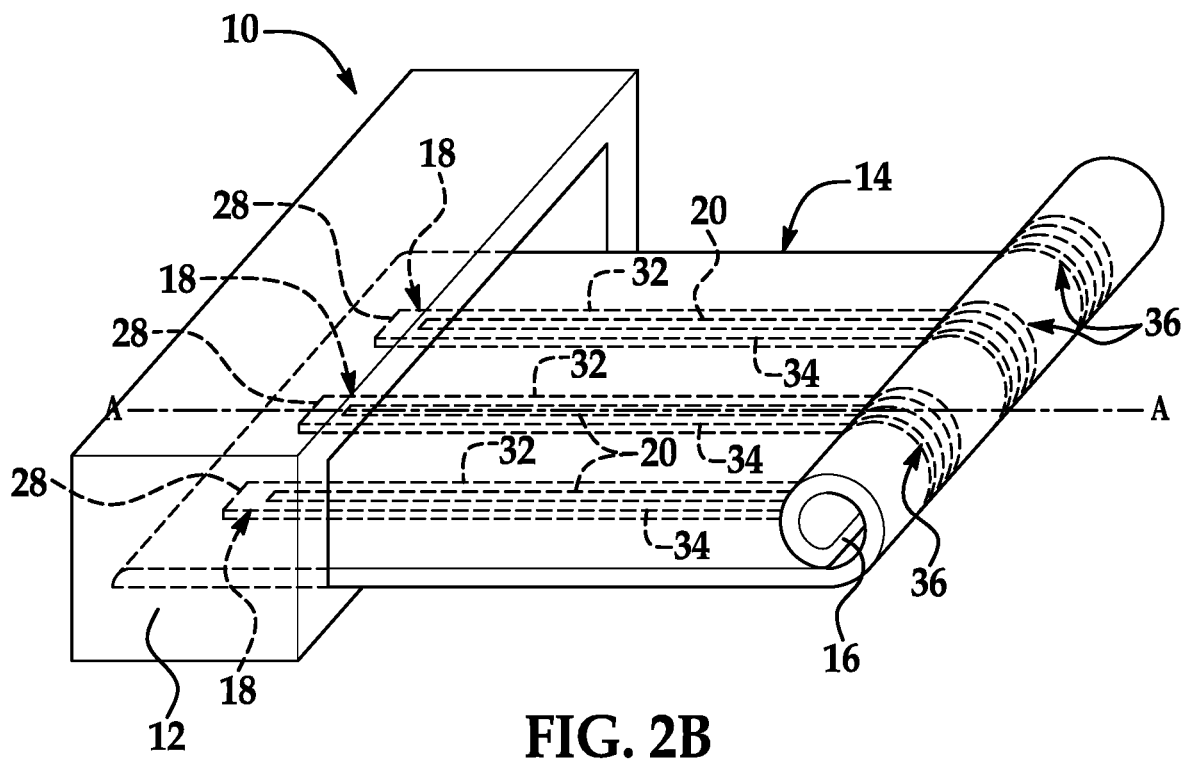
FIG. 2B is a perspective view of the airbag being rolled in the uninflated state during assembly.
Figure 2C:
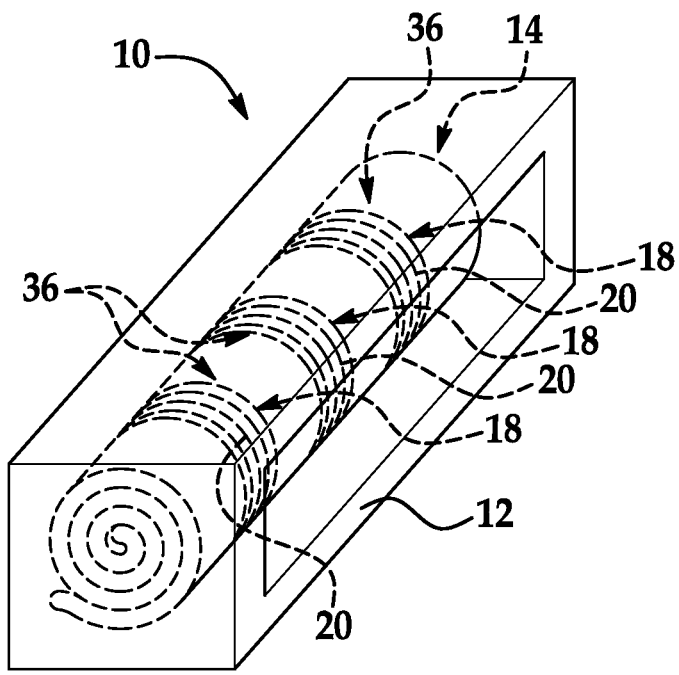
FIG. 2C is a perspective view of the airbag rolled in an assembled position after assembly.
Figure 3:
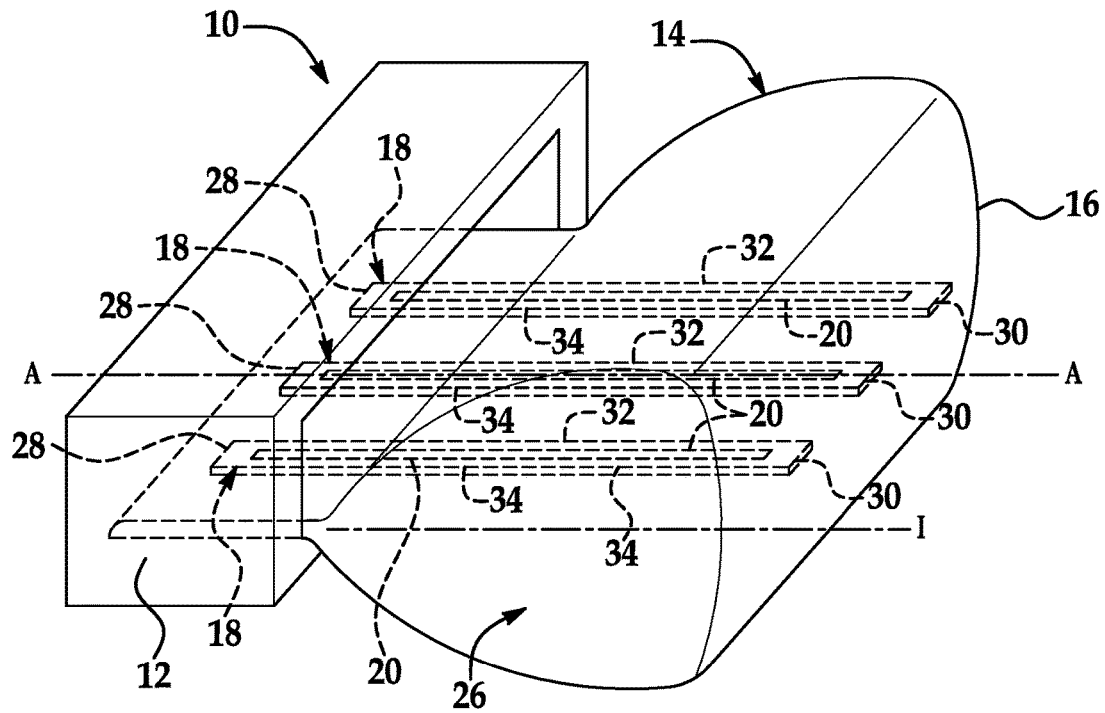
FIG. 3 is a perspective view of the airbag in an inflated state including the multi-layered tether attached to the impact panel.
Figure 5A:
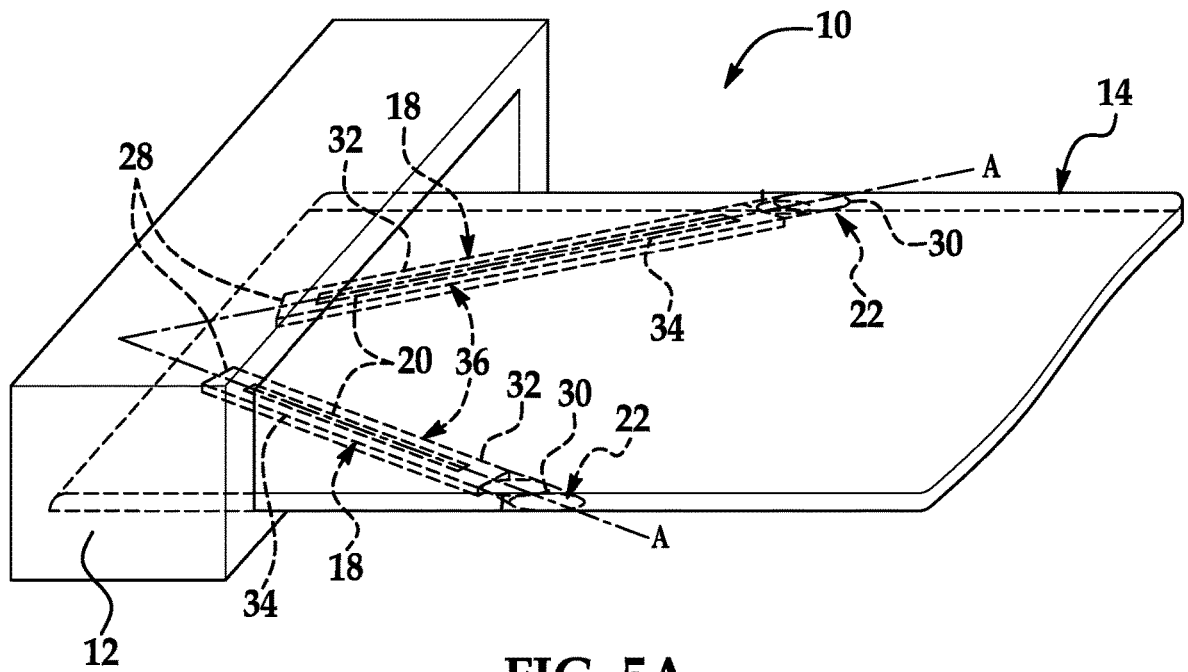
FIG. 5A is a perspective view of the airbag in the flat position state during assembly including a vent and a vent flap in a closed position.
Figure 5B:
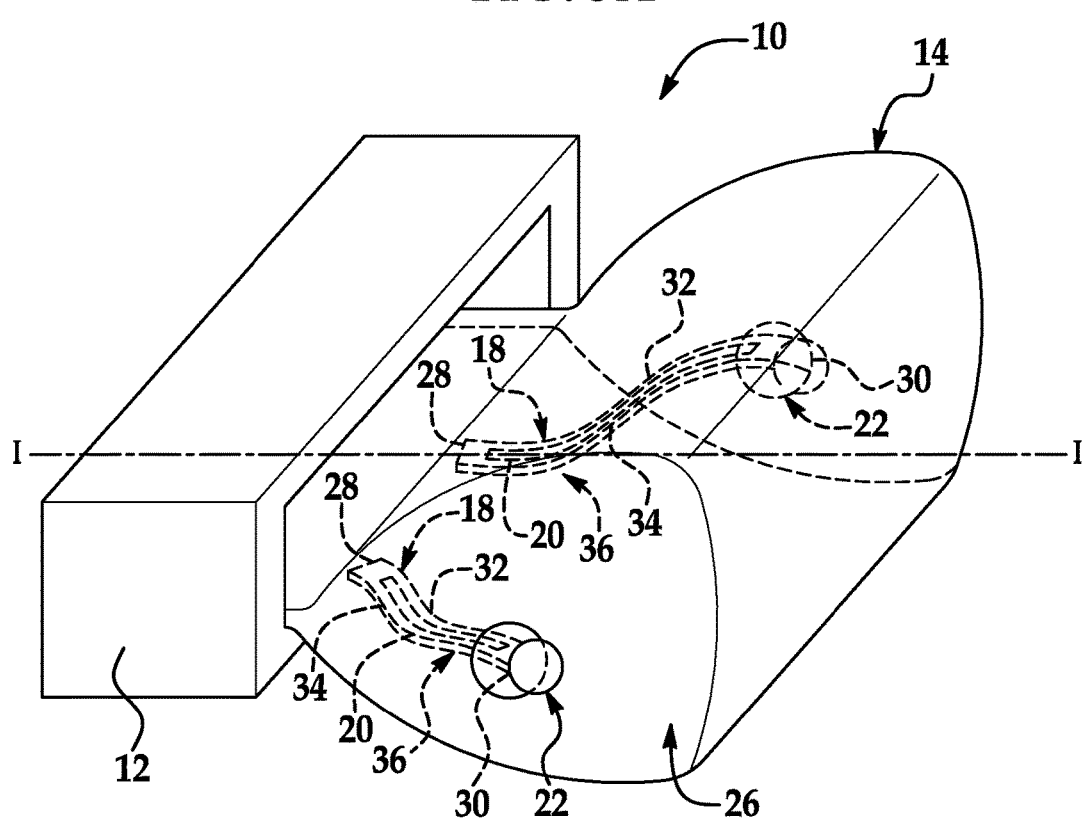
FIG. 5B is a perspective view of the airbag in the inflated state including the vent flap in an open position.

In the uninflated state, the airbag 14 is furled, i.e., rolled, folded, etc., from the flat position, as shown in FIGS. 1 and 5A, to an assembled position, as shown in FIG. 2C. Specifically, the airbag 14 may be furled towards the base 12 from the flat position to the assembled position. The airbag 14 may be furled in any suitable manner towards the base 12. The airbag 14 may be furled to the assembled position to both satisfy packaging requirements of the vehicle and to consistently inflate from the assembled position to the inflated state to provide maximum coverage of the occupant during a vehicle impact. For example, the airbag 14 may be folded towards the base 12, as shown in FIG. 2A. As another example, the airbag 14 may be rolled towards the base 12, as shown in FIG. 2B. The tether 18 and the reinforcement 20 are furled in the same manner as the airbag 14, as set forth further below.

In the assembled position, the airbag 14 may be unfurled, e.g., manually, to the flat position in the uninflated state. In this situation, the airbag 14 may be unfurled in the same manner in which the airbag 14 was furled to the assembled position. For example, when the airbag 14 is folded in the assembled position, the airbag 14 may be unfolded from the assembled position to the flat position. As another example, when the airbag 14 is rolled in the assembled position, as shown in FIG. 2C, the airbag 14 may be unrolled from the assembled position to the flat position. Alternatively, the airbag 14 may be unfurled by the inflation of the airbag 14 to the inflated state.

As set forth above, the airbag 14 is inflatable from the uninflated state to the inflated state. During inflation, the airbag 14 may extend along an inflation axis I, e.g., away from the base 12, as shown in FIG. 3. The airbag 14 may, for example, inflate along the inflation axis I towards and occupant. In other words, the airbag 14 may inflate away from the base 12 towards an occupant. In this situation, the airbag 14 may unfurl, e.g., along the inflation axis, from the assembled position to the inflated state. The airbag 14 may have any suitable shape in the inflated state, e.g., tubular, bulbous, etc.

The airbag 14 may define an inflation chamber 26. The inflation chamber 26 may inflate along the inflation axis I during inflation. In the inflated state, the axis A may, for example, be parallel to the inflation axis I, as shown in FIG. 3. In other words, the tether 18 may extend along the inflation axis I in the inflated state. Alternatively, the axis A may not be parallel to the inflation axis I in the inflated state, as shown in FIG. 5B. In other words, the tether 18 may extend transverse to the inflation axis I in the inflated state.

The airbag 14 may include a vent 22 to aid in the management of the inflation medium or gas during inflation of the airbag 14. The airbag 14 may include any suitable number of vents 22. The vent 22 may, for example, be an unrestricted opening or hole in the airbag 14. As another example, the vent 22 may be an adaptive vent, as shown in FIGS. 5A and 5B. The vent 22 may, for example, face transverse to the inflation axis I in the inflated state, e.g., transverse to an occupant. The vent 22 may extend through the airbag 14 to the inflation chamber 26. In other words, the vent 22 may allow gas to exit the inflation chamber 26 to the environment. Said differently, the inflation chamber 26 may be in fluid communication with the environment through the vent 22.

The airbag 14 may include a panel 16. The panel 16 may be any suitable type of panel. For example, the panel 16 may be referred to as an "impact panel." In this situation, the panel 16 may, for example, face an intended occupant, e.g., the occupant of a seat, in the inflated state. Specifically, the panel 16 is positioned to receive and be impacted by the occupant when the airbag assembly 10 is inflated during an impact that urges the occupant toward the airbag assembly 10. The panel 16 may partially define the inflation chamber 26. For example, the panel 16 may be in fluid communication with the inflation chamber 26. In this situation, the panel 16 may be pushed away from the base 12 along the inflation axis I by gas flow in the inflation chamber 26 during inflation of the airbag 14. Specifically, the panel 16 may be spaced from the base 12 along the inflation axis I in the inflated state, as shown in FIG. 3. In other words, the inflation chamber 26 may be disposed between the panel 16 and the base 12 in the inflated state.

The tether 18 may be fabric. In other words, the tether 18 may include woven threads. The tether 18 may be of the same or a different material type as the airbag 14. For example, the tether 18 may be nylon, e.g., nylon fabric.

The airbag assembly 10 may include any suitable number of tethers 18 disposed in the inflation chamber 26. The airbag assembly 10 may include any suitable number of reinforcements 20. For example, the airbag assembly 10 may include the same number of reinforcements 20 as tethers 18, as shown in FIG. 1-3. In this situation, one reinforcement 20 is attached to each tether 18. As another example, the airbag assembly 10 may include more tethers 18 than reinforcements 20. In this situation, at least one tether 18 may lack a reinforcement 20.

The tether 18 may be disposed in the inflation chamber 26. For example, the tether 18 may extend across the inflation chamber 26 from the base 12 to the airbag 14, as shown in the Figures. For example, as shown in FIGS. 1-3, the tether 18 may extend to the panel 16. In this situation, tether 18 may, for example, be attached to the impact panel, i.e., the panel 16. Specifically, the second end 30 of the tether 18 may extend and be attached to the impact panel, i.e., the panel 16. As another example, the tether 18 may extend to the vent 22, as shown in FIGS. 5A and 5B. In this situation, the second end 30 of the tether 18 may extend to the vent 22. In such an example, the vent 22 may be an "adaptive vent." In other words, the vent 22 may be releasable from a closed position to an open position. In the closed position, as shown in FIG. 5A, the vent 22 may prevent fluid communication between the inflation chamber 26 and the environment. The tether 18 may retain the vent 22 in the closed position. The airbag 14 may include a release (not shown), as is known, configured to selectively release the tether 18. In other words, the release may releasably connect the tether 18 to the base 12. Any suitable mechanism for releasing or severing the tether 18 may be employed. For example, the release may be actuated pyrotechnically. Alternatively, the release may be actuated mechanically, pneumatically, hydraulically, etc. and may include a pin-type release. The release may, for example, disconnect the tether 18 from the base 12. In this situation, the vent 22 may release to the open position, as shown in FIG. 5B. In other words, the vent 22 may allow inflation medium or gas to flow from the inflation chamber 26 to the environment, i.e., the vent 22 may allow fluid communication between the inflation chamber 26 and the environment.

The first end 28 of the tether 18 may be attached to the base 12 in a same or different manner as the airbag 14. The first end 28 of the tether 18 may be attached to the base 12 in any suitable manner. For example, the first end 28 of the tether 18 may be attached to the base 12 by clips, panels, or any other suitable manner, as set forth above. The second end 30 of the tether 18 may be attached to the airbag 14, e.g., the panel 16, the vent 22, etc., in any suitable manner, e.g., stitching, ultrasonic welding, etc.

The tether 18 may include sides 32, 34 spaced from each other transverse to the axis A. The sides 32, 34 may be elongated from the first end 28 to the second end 30. In other words, the tether 18 may be elongated along the axis A in the flat position. The sides 32, 34, the first end 28, and the second end 30 may define a boundary of the tether 18. The tether may have any suitable shape, e.g., rectangular.

The tether 18 may be furled in the assembled position. Specifically, the tether 18 may be furled, i.e., folded, rolled, etc., about an axis transverse to the axis A, e.g., perpendicular to the axis A. Since the tether 18 is elongated about the axis A, the reinforcement 20 provides little, if any, resistance to the furling of the tether 18 to the assembled position. The tether 18 may, for example, be furled towards the base 12 in the assembled position. In other words, the tether 18 may be furled along the axis A in the assembled position. For example, the tether 18 may be furled from the second end 30 of the tether 18 towards the first end 28 of the tether 18. In other words, the second end 30 of the tether 18 may be closer to the first end 28 of the tether 18 in the assembled position as compared to the flat position. The tether 18 may be furled in the same manner as the airbag 14. For example, when the airbag 14 is folded towards the base 12, the tether 18 may be folded towards the base 12, as shown in FIG. 2A. In other words, the tether 18 may be folded from the second end 30 towards the first end 28. The tether 18 may, for example, be folded along a fold axis (not shown) transverse to the axis A. The tether 18 may include any suitable number of folds. As another example, when the airbag 14 is rolled towards the base 12, the tether 18 may be rolled from the second end 30 towards the first end 28. The tether 18 may be rolled any suitable amount from the second end 30 towards the first end 28. For example, the tether 18 may be rolled from the second end 30 to the first end 28. The tether 18 may, for example, be rolled along a roll axis (not shown) transverse to the axis A.

The tether 18 may be unfurlable from the assembled position in a same manner as the airbag 14. For example, the tether 18 may be unfurled, e.g., manually, to the flat position in the uninflated state. Alternatively, the tether 18 may be unfurled during inflation of the airbag 14 to the inflated state.

The reinforcement 20 is furled in the assembled position. The reinforcement 20 may, for example, be furled towards the base 12 in the assembled position. In other words, the reinforcement 20 may be furled along the axis A in the assembled position. For example, the reinforcement 20 may be furled from the second end 30 of the tether 18 towards the first end 28 of the tether 18. Since the reinforcement 20 is fixed to the tether 18, the reinforcement 20 is furled in the same manner as the tether 18. For example, when the tether 18 is folded along the axis A, as shown in FIG. 2A, the reinforcement 20 is folded along the axis A, e.g., from the first end 28 of the tether 18 to the second end 30 of the tether 18. In other words, the reinforcement 20 is folded along the fold axis. The reinforcement 20 may include any suitable number of folds, e.g., the same number of folds as the tether 18. As another example, when the tether 18 is rolled, as shown in FIG. 2B, the reinforcement 20 is rolled along the axis A, e.g., from the first end 28 of the tether 18 to the second end 30 of the tether 18. In other words, the reinforcement 20 is rolled along the roll axis. The reinforcement 20 may be rolled the same amount from the second end 30 to the first end 28 of the tether 18, e.g., along the axis A, as the tether 18.

The reinforcement 20 may be unfurlable from the assembled position in a same manner as the tether 18. For example, the reinforcement 20 may be unfurled, e.g., manually, to the flat position in the uninflated state. Alternatively, the reinforcement 20 may be unfurled during inflation of the tether 18 to the inflated state.

The reinforcement 20 is disposed in the inflation chamber 26. As set forth above, the reinforcement 20 is elongated along the axis A in the flat position and attached to the tether 18. The reinforcement 20 may extend any suitable amount along the axis A. Specifically, the reinforcement 20 may be elongated along the axis A. For example, the reinforcement 20 may extend from the first end 28 to the second end 30 of the tether 18. Alternatively, the reinforcement 20 may be disposed between the first end 28 and the second end 30 of the tether 18. In other words, the reinforcement 20 may be spaced from the first end 28 and the second end 30 of the tether 18. The reinforcement 20 may be attached to the tether 18 in any suitable manner. For example, the reinforcement 20 may be attached to the tether 18 by stitching. As another example, the reinforcement 20 may be attached to the tether 18 by ultrasonic welding.

The reinforcement 20 may have any suitable shape. For example, the reinforcement 20 may have a rectangular prism shape, as shown in the Figures. In other words, the reinforcement may have a rectangular shape in a plane normal to the axis A in the flat position. The reinforcement 20 may extend any suitable amount towards the sides 32, 34 of the tether 18, i.e., transverse to the axis A. For example, the reinforcement 20 may extend from one side 32 to the other side 34. Alternatively, the reinforcement 20 may be spaced from one or both sides 32, 34.

The reinforcement 20 includes a material thickness T. The material thickness T of the reinforcement 20 extends in a direction D1 normal to the axis A in the flat position. The material thickness T may be thin in the direction D1. In other words, the reinforcement 20 may extend a greater amount along the axis A and towards the sides 32, 34 of the tether 18 than in the direction D1. The material thickness T of the reinforcement 20 is less than or equal to approximately 0.5 mm. The material thickness T may resist twisting about the axis A during assembly of the airbag assembly 10. The material thickness T may allow the reinforcement 20 to furl along the axis A, as set forth further below.

The reinforcement 20 may be a polymer film. For example, the reinforcement 20 may be a polyester film. As one example, the reinforcement 20 may be biaxially-oriented polyethylene terephthalate, e.g., available under the trade name Mylar. Alternatively, the reinforcement 20 may be any suitable material of a suitable dimension to have a greater torsional rigidity about the axis A than the tether 18. For example, the reinforcement 20 may be mylar. As another example, the reinforcement 20 may be any suitable plastic.

Figure 4A:
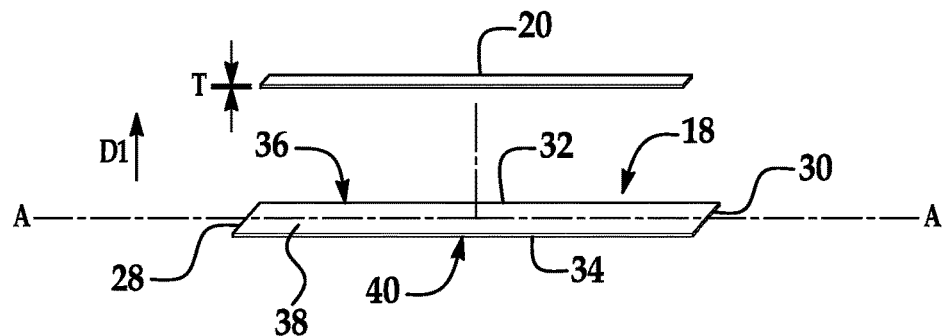
FIG. 4A is an exploded view of one embodiment of the multi-layered tether.
Figure 4B:
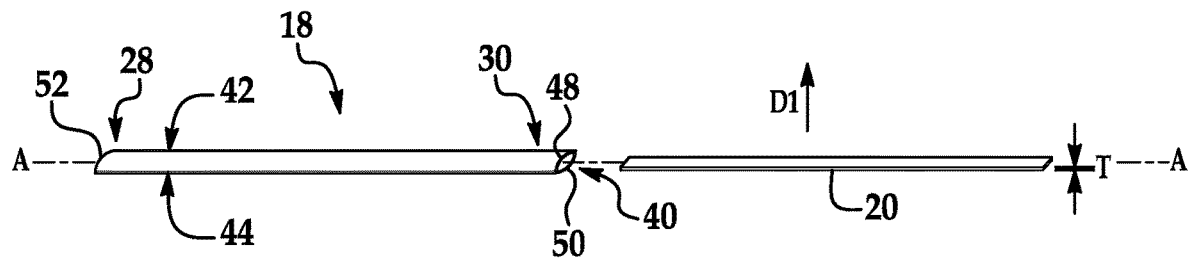
FIG. 4B is an exploded view of another embodiment of the multi-layered tether.

The tether 18 and the reinforcement 20 may form a multi-layered tether 36. One embodiment of the multi-layered tether 36 is shown in FIG. 4A, and another embodiment of the multi-layered tether 36 is shown in FIG. 4B. In the embodiment shown in FIG. 4A, the multi-layered tether 36 includes two layers. In the embodiment shown in FIG. 4B, the multi-layered tether 36 includes three layers. Common numerals are used to identify common features in the two embodiments.

In the embodiment shown in FIG. 4A, the tether 18 and the reinforcement 20 may each form one layer of the multi-layered tether 36. The tether 18 may include a first surface 38 and a second surface 40 facing opposite directions. The first surface 38 and the second surface 40 may, for example, face in directions transverse to the axis A. The first surface 38 and the second surface 40 may each extend from the first end 28 to the second end 30 and to the sides 32, 34 of the tether 18. The reinforcement 20 may be disposed on, e.g., abut, one of the first surface 38 and the second surface 40. The reinforcement 20 may be attached to one of the first surface 38 and the second surface 40 of the tether 18 in any suitable manner, as set forth above. Specifically, the reinforcement 20 may be disposed on and attached to the first surface 38.

In the embodiment shown in FIG. 3B, the reinforcement 20 may form one layer and the tether 18 may form two layers of the multi-layered tether 36. Specifically, the reinforcement 20 may be covered by the tether 18. In other words, the tether 18 may extend entirely over the reinforcement 20. For example, the tether 18 may include a first portion 42 and a second portion 44 defining a cavity 46 therebetween. The cavity 46 may extend along the axis A, e.g., from the first end 28 to the second end 30 of the tether 18. The reinforcement 20 may be disposed in the cavity 46. In this embodiment, the first portion 42 and the second portion 44 of the tether 18 may each form one layer of the multi-layered tether 36. Said differently, the tether 18 may form a top layer and a bottom layer, and the reinforcement 20 may form a middle layer disposed between the top layer and the bottom layer. The first portion 42 and the second portion 44 may be attached to each other around the reinforcement 20, e.g., by stitching, ultrasonic welding, etc.

In this embodiment, the first portion 42 and the second portion 44 may be part of one tether 18, as shown in FIG. 4B. In this situation, the tether 18 may include a first edge 48 and a second edge 50 defining an opening (not numbered) of the cavity 46. The tether 18 may include a fold 52 extending transverse to the axis A spaced from the first edge 48 and the second edge 50, i.e., the opening. In this situation, the first portion 42 extends from the first edge 48 to the fold 52 and the second portion 44 extends from the second edge 50 to the fold 52. In this situation, the first portion 42 and the second portion 44 define the cavity 46. For example, the sides 32, 34 of the tether 18, i.e., the first portion 42 and the second portion 44, may be attached together from the fold 52 to the first and second edges 48, 50. In this situation, the fold may, for example, define one of the first end 28 and the second end 30 of the tether 18. In other words, the fold may be attached to one of the base 12 and the panel 16. Additionally, the first edge 48 and the second edge 50 may define the other of the first end 28 and the second end 30 of the tether 18. The first edge 48 and the second edge 50 may, for example, be attached together, e.g., when the reinforcement 20 is disposed in the cavity 46, then attached to the other of the base 12 and the panel 16. As another example, the first edge 48 and the second edge 50 may be separately attached to the other of the base 12 and the panel 16, such that the other of the base 12 and the panel 16 encloses the cavity 46.

Alternatively, the first portion 42 and the second portion 44 may each be separate tethers 18 attached together to define the cavity 46. In this situation, the reinforcement 20 may be disposed on the first portion 42, and the second portion 44 may be disposed on the reinforcement 20. In other words, the reinforcement 20 may be disposed between, i.e., sandwiched by, the first portion 42 and the second portion 44. The first portion 42 and the second portion 44 may be attached together at the first end 28 and the second end 30. Additionally, the first portion 42 and the second portion 44 may be attached together along the sides 32, 34.

In use, the tether 18 is attached to the base 12 and the panel 16. During assembly of the airbag assembly 10, the reinforcement 20 prevents the tether 18 from twisting about axis A. In other words, the reinforcement 20 prevents the second end 30 of the tether 18 from twisting relative to the first end 28 of the tether 18 during assembly. Additionally, the reinforcement 20 allows the tether 18 to be furled along the axis A to the assembled position in the uninflated state, and the reinforcement 20 allows the tether 18 to unfurl during inflation of the airbag 14 to the inflated state. By having a greater torsional rigidity than the tether 18, the reinforcement 20 maintains the desired orientation of the tether 18 during assembly, which assists in preventing the tether 18 from twisting during assembly. Also, by allowing the tether 18 to furl along the axis A, the reinforcement 20 and the tether 18 are furled in the uninflated state, which may assist in satisfying packaging requirements, and unfurl during inflation to the inflated state, which may assist in the operation of the airbag 14.

The adverb "approximately" means that a shape, structure, measurement, value, determination, calculation, etc. may deviate from an exactly described geometry, distance, measurement, value, etc., because of imperfections in materials, machining, manufacturing, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag assembly comprising:
    a base;
    an airbag extendable from the base to a flat position prior to inflation;
    a tether elongated along an axis from a first end of the tether attached to the base to a second end of the tether attached to the airbag in the flat position; and
    a reinforcement elongated along the axis in the flat position and attached to the tether, the reinforcement having a greater torsional rigidity about the axis than the tether.

2. The airbag assembly of claim 1, wherein the reinforcement extends from the first end to the second end of the tether.

3. The airbag assembly of claim 1, wherein the airbag is furled in the base in an assembled position and the tether and the reinforcement are furled from the second end towards the first end in the assembled position.

4. The airbag assembly of claim 1, wherein the tether includes a first surface and a second surface each extending from the first end to the second end and facing in opposite directions, the reinforcement is disposed on one of the first surface and the second surface.

5. The airbag assembly of claim 1, wherein the tether defines a cavity extending along the axis in the flat position and the reinforcement is disposed in the cavity.

6. The airbag assembly of claim 1, wherein the airbag is furled in an assembled position, the tether and the reinforcement are furled along the axis in the assembled position.

7. The airbag assembly of claim 1, wherein the reinforcement has a thickness extending transverse to the axis, the thickness is less than or equal to approximately 0.5 mm.

8. The airbag assembly of claim 1, wherein the reinforcement is stitched to the tether.

9. The airbag assembly of claim 1, wherein the airbag defines an inflation chamber, the tether and the reinforcement are disposed in the inflation chamber.

10. The airbag assembly of claim 1, wherein the reinforcement is biaxially-oriented polyethylene terephthalate.

11. The airbag assembly of claim 10, wherein the tether is fabric.

12. The airbag assembly of claim 1, wherein the reinforcement has a rectangular prism shape.

13. The airbag assembly of claim 1, wherein the airbag includes an impact panel and the tether is attached to the impact panel.

14. The airbag assembly of claim 1, wherein the airbag includes a vent and the tether extends to the vent.

15. The airbag assembly of claim 14, further comprising a release releasably connecting the tether to the base.

16. The airbag assembly of claim 15, wherein the release is pyrotechnic.

* * * * *